United States Patent
Gotshall

[15] 3,644,131
[45] Feb. 22, 1972

[54] REINFORCING AGENT FROM SCRAP RUBBER CHAR

[72] Inventor: William W. Gotshall, 3081 Walma Drive, Orchard Lake, Mich. 48034

[22] Filed: Mar. 25, 1970

[21] Appl. No.: 22,648

[52] U.S. Cl..............................106/307, 23/209.2, 260/763
[51] Int. Cl...........................................................C09c 1/44
[58] Field of Search..........106/307; 23/209.2, 209.4, 209.6; 260/763

[56] References Cited

UNITED STATES PATENTS

| | | | |
|---|---|---|---|
| 2,758,940 | 8/1956 | Baker et al............................ | 23/209.4 |
| 3,404,019 | 10/1968 | Gotshall................................ | 106/307 |

Primary Examiner—James E. Poer
Attorney—Joseph C. Herring, Richard C. Willson, Jr. and Jack L. Hummel

[57] ABSTRACT

Scrap rubber, e.g., scrap tire stock, is destructively distilled to produce a carbonaceous char which is then ground to particles having an average particle size of less than about 2.5 microns with at least 99 percent by weight less than 5 microns. The grinding is accomplished under a nonoxidizing atmosphere and the particles are protected from oxygenation of their surfaces until they have been coated with an organic liquid. The resulting coated carbon particles are useful in the production of reinforced elastomeric compositions, e.g., SBR or EPDM or natural rubber, butyl or chlorobutyl tire components.

10 Claims, No Drawings

REINFORCING AGENT FROM SCRAP RUBBER CHAR

CROSS REFERENCES TO RELATED APPLICATIONS

The following U.S. patent applications relate to the general field of the present invention: Ser. No. 22,645 filed Mar. 25, 1970, Ser. No. 22,646 filed Mar. 25, 1970, Ser. No. 22,647 filed Mar. 25, 1970, Ser. No. 476,504, now U.S. Pat. No. 3,493,532, and Ser. No. 774,551, now U.S. Pat. No. 3,573,241, filed July 22, 1968.

BACKGROUND OF THE INVENTION

1. Field of the Invention

The present invention relates to the general field of pigments (classified in class 106 and more particularly to subclass 307 thereof, "Elemental carbon-containing pigments, fillers, or aggregates." Rubber and other elastomeric compositions containing the carbons of the present invention are classified in class 260, subclass 763, "Vulcanizable natural hydrocarbon gums with elemental carbon filler, dye or pigment." (All of the above classes and subclasses refer to those of the United States Patent Office.)

2. Description of the Prior Art

U.S. Pat. No. 3,404,019 to the inventor of the present application, relates to forms of carbon derived from coke, some of which forms are coated with organic liquids to prevent oxygenation of the surface. Report of investigations 7302 "Destructive Distillation of Scrap Tires," of the Bureau of Mines, United States Department of the Interior (Sept., 1969) discusses the use of destructive distillation for disposing of scrap automobile and truck tires to produce solid liquid and gaseous products, but no uses are suggested for the solid products. That report states that 5.5 billion pounds of new rubber (natural and synthetic combined) and in excess of 400 million pounds of fabric were utilized in 1968 in the production of tires, only a small portion of which are retreaded. Stricter pollution laws will gradually eliminate burning of scrap tires in open air dumps. Tires make poor land fill because they do not readily degrade.

SUMMARY

General Statement of the Invention

The present invention prepares reinforcing fillers suitable for use in polymeric compositions including rubbers (synthetic and natural), polyolefin polymers, etc., by destructively distilling scrap elastomeric compositions to form a carbonaceous char which is ground to particles having an average particle size of less than about 2.5 microns and at least 99 percent by weight less than 5 microns, with the grinding being done under a nonoxidizing atmosphere and the individual particles thereafter being coated with an organic liquid barrier to prevent oxygenation of their surface. It has been found that the resulting coated particles are useful for the preparation of superior polymeric products.

By converting scrap rubber into such coated carbon products a large portion (roughly 40–60 percent in many instances) of scrap rubber tires can be recycled back into tire production. Thus, disposal and reclaiming are combined and a large portion of the composition of a tire may be used over and over again.

Utility of the Invention

In addition to the above-stated use as reinforcing fillers for rubbers and other polymeric compositions, the products of the present invention will be suitable for many of the other applications of conventional carbon blacks.

DESCRIPTION OF PREFERRED EMBODIMENTS

Starting Materials

Scrap rubber, e.g., scrap rubber tires with or without removal of the bead, are the preferred feed materials for producing the carbonaceous char utilized by the present invention. The tire may be made of styrene-butadiene (SBR), natural rubber, chlorobutyl rubber, ethylene-propylene-diolefin pure polymer (EPDM), as well as other scrap rubber materials such as neoprene, chloroprene, fluoroprene, and buna N rubber articles. These rubber compositions will generally also contain substantial amounts (e.g., perhaps 25 percent by weight average) of carbon black, reinforcing fabrics, sulfur, zinc oxide, extending oils, stearic acid, and various other conventional rubber components. The present invention, by destructive distillation, converts these to a char consisting primarily of carbon with less than 5 percent (more preferably less than about 2 percent) hydrogen and with less than 5 percent (more preferably less than about 3 percent) sulfur. Lesser amounts of nitrogen and oxygen may occasionally be present, but are not particularly desirable. The present invention then combines this destructive distillation with grinding in a nonoxidizing atmosphere and coating to protect the surface of the resulting particles from oxygenation. It has been discovered, as shown in the examples hereof, that excellent reinforcing properties are thereby imparted to the char particles.

The organic liquids utilized to coat the individual particles of char and to act as barriers to prevent oxygenation of the surface are preferably hydrocarbons, more preferably aromatic hydrocarbons, and most preferably heavy oils derived from the destructive distillation step. Light catalytic cycle oil and other refinery oils may also be employed as barrier liquids. In general, the barrier liquids should have a viscosity of from about 10 to 75 Saybolt seconds universal (SSU) at 100° F., more preferably a viscosity of 20 to 50 seconds, and most preferably a viscosity of 30 to 45 seconds. The liquid will preferably have an initial boiling point of above 300° F., more preferably above 400° F., and most preferably above 500° F.

Stearic acid or zinc stearate may also be employed, but these are relatively expensive as compared to the aforementioned organic liquids.

Apparatus

The destructive distillation is accomplished in a normal retort, e.g., gas or electric fired furnace having an overhead vent fitted with condensers for recovering condensable oils produced by the destructive distillation. Such apparatus is shown in FIG. 4 on page 6 of the aforementioned Bureau of Mines RI 7302.

The preferred grinding mills for pulverizing the carbonaceous char are fluid energy mills of the type commonly referred to as "hurricane mills," e.g., the Model No. 30-10 mill manufactured by Majac, Inc. of Sharpsburg, Pa. The fluid energy mills can operate on a wide variety of inert, nonoxidizing media. By nonoxidizing media is meant herein, media which do not contain substantial quantities of free oxygen. Steam is the most preferred grinding media from the standpoint of economy, but nitrogen, helium, hydrogen, argon, and a wide variety of other gases commonly thought of as inert or reducing, may be utilized. For maximum economy in grinding, gases of lower molecular weights, e.g., hydrogen and steam, are preferred.

Destructive distillation

Scrap tires are placed into the retort or furnace and heated to temperatures of from about 800° to about 2,800° F., more preferably from about 900° to about 2,400° F., and most preferably from about 1,100° to about 1,700° F. The destructive distillation takes place in the absence of substantial free oxygen so as to prevent conversion of carbon values into carbon dioxide or monoxide. A nitrogen bleed through the furnace can carry away the products of the destructive distillation. The condenser may be either air or water cooled and a suitable method for removal of char and for storing of the liquid product can be conventionally provided. As in most destructive distillation processes, it is preferable that the gaseous products be burned to provide at least a portion of the heat required for the destructive distillation.

The grinding process

The autogenous grinding mill is conventionally operated, preferably at temperatures of from about 350° to about 800° F., more preferably from about 400° to about 700° F., and most preferably at 400°–500° F. The classifier is operated to provide an average particle size (by weight) of less than about 2.5 microns with 99 percent by weight of the product having particle size of less than 5 microns. More preferred ranges are average particle size of less than 1.5 and 99 percent by weight less than 3 microns.

Coating the particles

The char particles are coated with from 1 to 8, percent, more preferably 2 to 6 percent, and most preferably 3 to 5 percent by weight (based on the weight of the particles) of the organic barrier liquid. The coating step can be accomplished by feeding the organic liquid and the particles into a dry blender, e.g., a ribbon blender such as those manufactured by J. H. Day Company and intimately admixing the two ingredients so as to coat substantially all of the individual particles with the barrier liquid. The techniques of copending application Ser. No. 22,645 filed Mar. 25, 1970, can be utilized to coat the particles. The coating process and any storage between the grinding and the coating processes are accomplished under a nonoxidizing atmosphere, e.g., nitrogen.

Examples

The invention will be more fully understood by reference to the following examples which are to be considered as merely illustrative thereof.

EXAMPLE I

Passenger tires, primarily SBR elastomer, are debeaded and subjected to destructive distillation under $N_2$ atmosphere, at approximately 1,650° F. in a closed retort as described generally in the aforementioned U.S. Bureau of Mines RI 7302. The resulting gases are burned to heat the retort, the liquid product is condensed and retained and the solid char is used as described below. Thus, substantially only $CO_2$ and steam are emitted and no atmospheric pollution is caused.

The resulting char is pregranulated in a conventional roller mill to prepare it for feeding into a fluid energy mill. The fluid energy mill employed is the Majac, Inc. Model 30–10 operating on steam with an approximately sonic velocity and a temperature of approximately 450° F. leaving the nozzles of the mill. This particular mill has opposed nozzles which cause a stream of particles to impinge upon a second stream of particles causing highly efficient autogenous grinding. This grinding process is continued with particles having an average particle size of below about 1.5 microns and 99 percent by weight having a particle size below about 3 microns being continuously withdrawn from the classifier of the Majac mill. The product goes into a conventional bag-type dust collector system from which it is recovered, still under an atmosphere of superheated steam. The dust collector has an interior temperature of about 350° F. and operates at approximately atmospheric pressure. The product falls directly from the dust collector into a ribbon-type dry blender manufactured by J. H. Day, the interior of which is kept continuously under a blanket of inert gas composed of 85 percent nitrogen and 15 percent $CO_2$. Four percent by weight (based on the weight of the char) of the heavy oils from the destructive distillation having an initial boiling point above about 300° F. and a viscosity of about 35 SSU is slowly blended into the char. The blended product is then pelletized, stored into bins and is designated "AF 107."

EXAMPLE II

Batches were formulated according to the following formulation:

SBR 1502 100.00 parts by weight
zinc oxide 5.00 parts by weight
stearic acid 2.00
sulfur 1.75
Santocure accelerator 1.30

Four separate stocks were mixed using the above formulation:

| | | |
|---|---|---|
| G 6233 | 50.0 parts | SRF |
| G 6234 | 50.0 parts | AF 107 |
| G 6235 | 75.0 parts | medium thermal black (MT) |
| G 6236 | 75.0 parts | AF 107 |

EXAMPLE III

Each of the above stocks was tested, without aging, at room temperature according to the physical tests of the American Society for Testing Materials, D 412, D 676, and D 624 and the results were as tabulated below:

Analyses of these results shows that, at equal volume and weight loading, the inexpensive coated pulverized carbon of

| Sample | 307° F., cure, minutes | Modulus at 100%, Lbs. | Modulus at 300%, Lbs. | Ultimate Tensile, Lbs. | Percent Elongation | Set | Shore hardcreep | Die A tear, Lbs. |
|---|---|---|---|---|---|---|---|---|
| G6233 | 15 | 250 | 1,150 | 2,660 | 620 | 16 | 58–56 | 290 |
| SRF | 30 | 350 | 1,600 | 2,550 | 450 | 7 | 64–62 | 180 |
| 1.163 | 50 | 350 | 1,680 | 2,540 | 420 | 7 | 63–61 | 179 |
| G6234 | 15 | 270 | 1,260 | 1,900 | 430 | 7 | 62–59 | 140 |
| 50–AF107 | 30 | 330 | 1,600 | 2,020 | 380 | 4 | 63–61 | 116 |
| 1.168 | 50 | 350 | 1,650 | 1,910 | 330 | 3 | 64–62 | 106 |
| G6235 | 15 | 150 | 390 | 1,550 | 970 | 39 | 51–42 | 280 |
| 75–MT | 30 | 270 | 880 | 1,340 | 460 | 10 | 63–60 | 122 |
| 1.233 | 50 | 270 | 910 | 1,230 | 380 | 6 | 63–60 | 109 |
| G6236 | 15 | 450 | 1,830 | 1,920 | 330 | 5 | 68–64 | 153 |
| 75–AF107 | 30 | 550 | 2,230 | 2,230 | 300 | 2 | 68–66 | 136 |
| 1.227 | 50 | 550 | | 2,180 | 280 | 2 | 69–67 | 138 | the inventor has a modulus substantially identical with that of semireinforcing furnace black, a relatively expensive commercial carbon black commonly used as the reinforcement filler for tire carcasses. (The reduction in tensile strength as compared to SRF, is generally not considered significant since the tensile stress in tires is carried primarily by the cords.)

Compared on an equal volume and weight loading with medium thermal carbon black (MT), the coated pulverized char of the present invention (AF 107) exhibits vastly higher modulus and tensile strength. Therefore, not only is the disposal of scrap tires accomplished, but the products both solid and liquid, are combined to form a substitute for carbon blacks which is greatly superior to medium thermal blacks and comparable in performance (in tire carcasses) to semireinforcing furnace black, general purpose furnace black, highmodulus furnace black, and certain other premium-priced carbon blacks.

Modifications of the Invention

It should be understood that the invention is capable of a variety of modifications and variations which will be made apparent to those skilled in the art by a reading of the specification and which are to be included within the spirit of the claims appended hereto. For example by lowering the temperature at which the destructive distillation is accomplished, the modulus of the finished "black" (that is, the modulus of a standard rubber formulation in which the black is incorporated to a standard loading) can be reduced according to the teachings of application Ser. No. 476,504, now U.S. Pat. No. 3,493,532, filed Aug. 2, 1965.

What is claimed is:

1. A process for the preparation of reinforcing fillers suitable for use in elastomeric compositions comprising in combination, the steps of:

a. destructively distilling scrap polymeric compositions at from about 800° to about 2,800° F. to produce carbonaceous char, gases and liquids, b. grinding said carbonaceous char to an average particle size of less than about 2.5 microns and at least 99 percent by weight less than 5 microns under a nonoxidizing atmosphere at a temperature of from about 350° to about 800° F., c. coating the individual particles of said ground carbonaceous char with an organic liquid barrier having a Saybolt Universal viscosity of from about 10 to about 75 seconds at 100° F., said particles being maintained under a nonoxidizing atmosphere until they are substantially completely coated with said organic liquid.

2. The process of claim 1 wherein the scrap polymeric composition is scrap containing carbon reinforcing material.

3. The process of claim 1 wherein the organic liquid comprises liquid products from said destructive distillation.

4. A carbonaceous pulverized material suitable for incorporation in elastomeric compositions consisting essentially of ground carbonaceous particles derived from destructive distillation of scrap rubber and having an average particle size of 2.5 microns and 99 percent by weight below 5 microns, each of said particles being substantially completely coated with an organic liquid barrier having a Saybolt Universal viscosity of from 10 to about 75 seconds at 100° F. and boiling above 300° F.

5. An elastomeric composition comprising from 25 percent to about 400 percent by weight of the product of claim 4.

6. The process of claim 1 wherein the organic liquid comprises liquid hydrocarbons.

7. The process of claim 4 wherein the organic liquid comprises liquid hydrocarbons.

8. The process of claim 1 wherein the organic liquid comprises aromatic hydrocarbons.

9. The process of claim 4 wherein the organic liquid comprises aromatic hydrocarbons.

10. The process of claim 1 wherein the organic liquid comprises catalytic cycle oil having an initial boiling point of above 400° F.

* * * * *